United States Patent [19]

Henderson

[11] 4,107,476
[45] Aug. 15, 1978

[54] ELECTRONIC TONE RINGER CONTROL CIRCUIT FOR A TELEPHONE SET

[75] Inventor: Edward Lloyd Henderson, Kanata, Canada

[73] Assignee: Northern Telecom Limited, Montreal, Canada

[21] Appl. No.: 838,493

[22] Filed: Oct. 3, 1977

[51] Int. Cl.² .............................................. H04M 1/00
[52] U.S. Cl. ..................................... 179/84 T; 361/91
[58] Field of Search ................. 179/84 R, 84 L, 84 T, 179/81 R, 184; 361/91, 110, 111

[56] References Cited

U.S. PATENT DOCUMENTS

| 3,860,764 | 1/1975 | Martin | 179/84 T |
| 3,965,307 | 6/1976 | Dimmer | 179/84 T |

Primary Examiner—Kathleen H. Claffy
Assistant Examiner—Joseph A. Popek
Attorney, Agent, or Firm—John E. Mowle

[57] ABSTRACT

A circuit for controlling the on-off ringing of a line powered electronic tone ringer in a telephone set. The circuit, which includes a variable rate charge-discharge suppression circuit, effectively prevents up to 300 volt peak, 12 Hz transient spikes on the line from actuating the tone ringer, yet still responds to a 35 volt RMS, 18 Hz ringing signal.

5 Claims, 2 Drawing Figures

ELECTRONIC TONE RINGER CONTROL CIRCUIT FOR A TELEPHONE SET

This invention relates to an improved control circuit used to control the on-off ringing of a line powered electronic tone ringer in a telephone set and more particularly to a suppression circuit for substantially preventing the tone ringer from generating audible tones resulting from transient voltages on the telephone line such as developed during dialling and hook switch flashing.

BACKGROUND OF THE INVENTION

The majority of telephone sets in use today use an electromechanical ringer actuated by 20Hz a-c ringing signals on the telephone line. Due to the inherent inertia required to move the ringer arm as well as built-in control mechanisms, little trouble is experienced in false ringing generated by transient voltage surges on the telephone line such as experienced during pulse dialling and hook switch flashing.

More recently, electronic tone ringers have been developed which are also powered by the same a-c ringing signals on the line. These ringing signals are first rectified and filtered to produce a d-c supply voltage which is then used to drive an oscillator which in turn develops the ringing signals in a small loudspeaker located in the telephone set. In order to prevent transient voltage spikes from momentarily operating the tone ringer, a two-stage RC filter in conjunction with a gating control circuit, is commonly used to control the d-c supply to the ringer. However, such a circuit provides only marginal protection against such spikes. The protection can be improved by increasing the time delay prior to actuation of the ringer. However, with the existing circuit, this would not be possible without increasing the input capacitances of the circuit, which would then affect the operating conditions of the balance of the telephone set.

STATEMENT OF THE INVENTION

The present invention overcomes the limitations of prior control circuits for an electronic tone ringer by including a unique suppression circuit which prevents low repetition frequency high magnitude transient signals from falsely triggering the tone ringer yet still allowing the standard a-c ringing signals to actuate the ringer after only a short delay.

Thus, in accordance with the present invention there is provided an improved control circuit for controlling the on-off ringing of a line-powered electronic tone ringer in a telephone set. The control circuit basically comprises a network for rectifying and filtering an incoming a-c voltage to the set to provide a d-c supply voltage. In addition the circuit includes a gating circuit for connecting the tone ringer to the d-c supply voltage when it exceeds a preselected minimum amplitude. The improvement in the control circuit is the inclusion of a suppression circuit for suppressing transient voltages, such as dial pulses having a magnitude greater than and a repetition frequency less than the a-c ringing signals, which substantially prevents false actuation of the gating circuit. The suppression circuit in turn comprises a capacitor connected across the input to the gating circuit for supplying a predictable and controlled voltage thereto. In addition the suppression circuit includes a source of constant current powered from the d-c supply voltage for charging the capacitor to develop an input control signal voltage across the gating control circuit. Also included is a means for rapidly discharging the capacitor when the amplitude of the input control signal voltage exceeds that of the d-c supply voltage, i.e. in the case where the d-c supply voltage is decreased.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
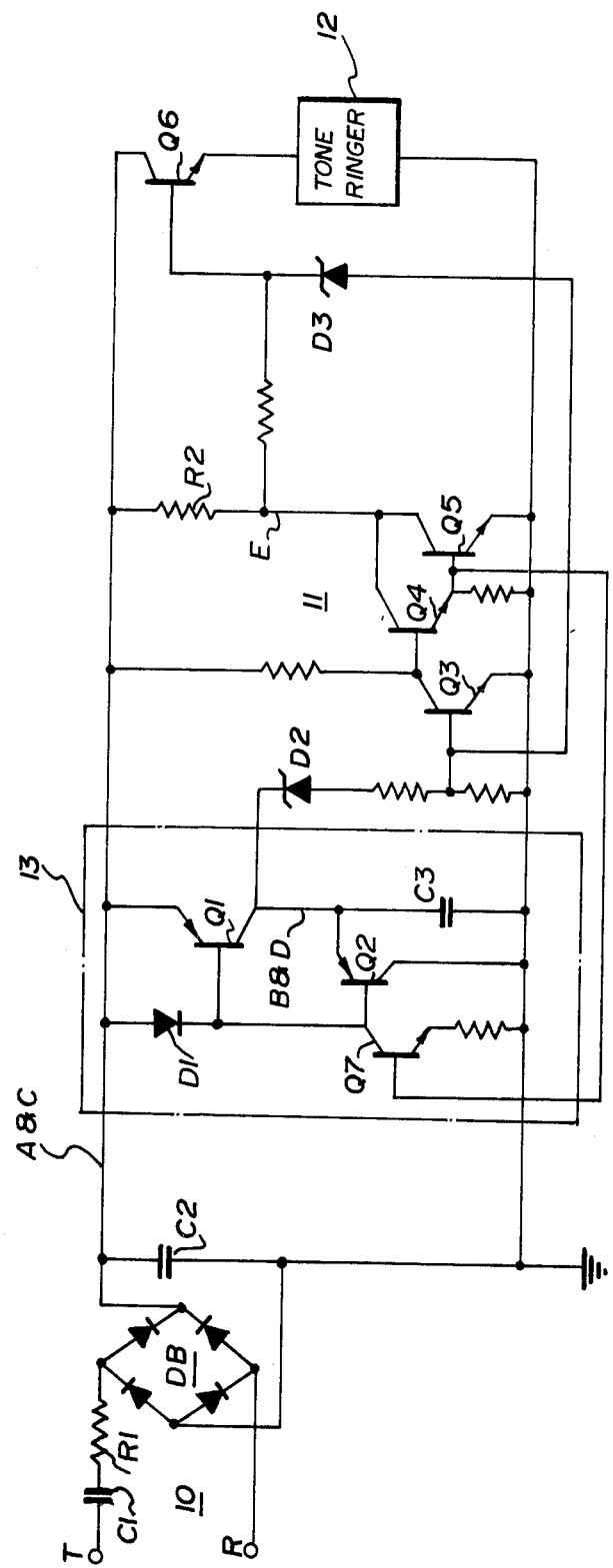
FIG. 1 is a schematic circuit diagram of an improved control circuit for an electronic tone ringer.

Referring to FIG. 1, the control circuit basically comprises a rectifier and filter network 10, the input of which is connected to the tip T and ring R of a telephone line. Connected across the output of the network 10 is a gating circuit 11 which is used to control the connection of a tone ringer 12 to the network 10. Interposed between the output of the network 10 and the input to the gating circuit 11 is a suppression circuit 13 which substantially prevents transient signal voltages on the telephone line from erroneously actuating the ringer 12.

Figure 2:
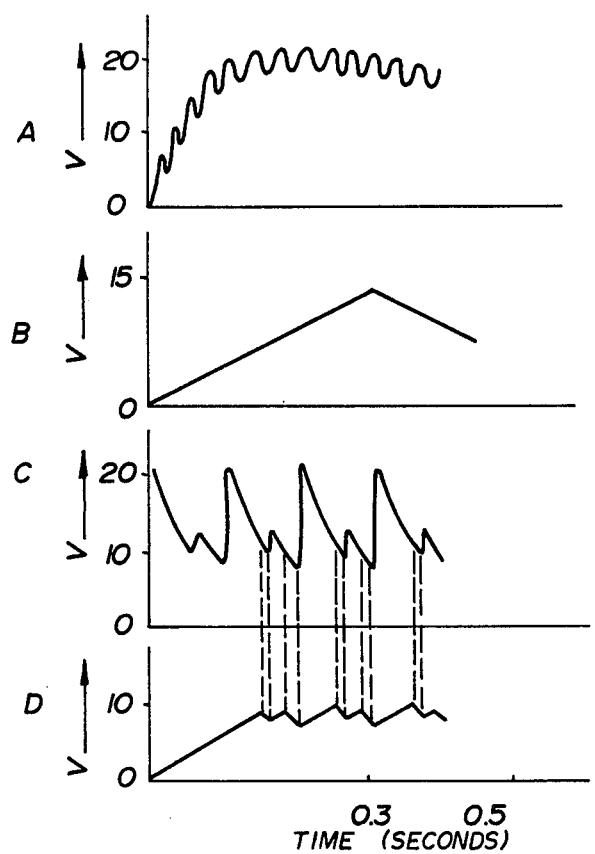
FIG. 2 shows typical voltage waveforms seen at various points in the circuit of FIG. 1 for both standard a-c ringing signals and for dial pulses.

Details of the structure of the control circuit will be evident from the following detailed description of its function and operation. In this description, various elements have not been described in detail where their function and operation is well known to those skilled in the art. In the following description and drawings, the locations of waveforms A, B, C, D of FIG. 2 are identified by corresponding reference characters in FIG. 1.

Input signals on T-R of the telephone line are coupled through a d-c isolating capacitor C1 and a resistor R1 to a conventional diode bridge DB and appear across the output of a capacitor C2 as a d-c supply voltage for the balance of the circuitry.

Initially assume that the suppression circuit 13 is absent and the cathode of zener diode D2 is connected to the top of capacitor C2. When a-c ringing signals are initially applied to T-R, the d-c supply voltage across capacitor C2 will commence to build up. When it reaches about 3 volts, transistors Q4 and Q5 will be turned on while transistor Q3 will be held off due to the absence of current flow through zener diode D2. The conduction of transistor Q5 effectively ties one side of resistor R2 to ground, which in turn prevents the d-c supply voltage from being gated to the tone ringer 12 through transistor Q6.

When the supply voltage across capacitor C2 reaches approximately 15 volts, zener diode D2 commences to conduct turning on transistor Q3, which in turn turns off transistors Q4 and Q5. This allows point E to rise turning on zener diode D3. Conduction of diode D3 then latches transistor Q3 hard on. Concurrently, transistor Q6 commences to conduct thereby gating the supply voltage from across capacitor C2 to the tone ringer 12.

If the a-c ringing signal is removed from across the T-R of the telephone line the voltage across capacitor C2 falls to about 9 volts whereupon diode D3 stops conducting. This turns off transistor Q3 which turns on transistors Q4 and Q5. This opens the gate transistor Q6 which disconnects the tone ringer 12 from the telephone line.

With this circuit arrangement, to prevent false ringing due to transient signals applied to the telephone line, resistor R1 must be large to limit the charging current to capacitor C2, while resistor R2 must be small to ensure a fast discharge of capacitor C2. However, this is unacceptable since the a-c voltage drop across resistor R1 is too large, and the circuit will not respond to the required minimum 35 volt RMS 18 Hz ringing signal applied to the T-R due to the low value of resistor R2.

This limitation has been overcome by the inclusion of the suppression circuit 13 which is connected as shown in FIG. 1. After application of a-c signals to the telephone line but before gating transistor Q6 is turned on, transistor Q7 acts as a constant current source. This causes a 50μA current to flow through diode D1. Since the base-emitter junction of transistor Q1 is connected in shunt with diode D1, a substantially identical current of 50μA flows through transistor Q1 and into capacitor C3 which is connected in shunt with the input to the gating circuit 11. Capacitor C3 commences to charge linearly.

The application of a standard 20Hz ringing signal generates a d-c voltage drop across capacitor C2 similar to that shown in waveform A of FIG. 2. This causes the voltage across capacitor C3 to rise as illustrated in waveform B of FIG. 2 until zener diode D2 turns on with approximately 15 volts thereacross which then operates the balance of the gating circuitry as hereinbefore described. However, when a transient condition occurs, the voltage across capacitor C3 is prevented from rising to the turn-on voltage of 15 volts. For example, waveform C of FIG. 2 illustrates a typical voltage across the capacitor C2 due to 50 volt 10Hz dial pulses applied to the T-R of the telephone line. Due to the inductive effect of the line, these pulses can often result in 200 to 300 volt peak transient spikes being applied to the telephone set. Waveform D on the other hand illustrates the voltage across capacitor C3 during this interval. Capacitor C3 continues to charge until the voltage drop across capacitor C2 falls slightly below that across capacitor C3 at which time transistor Q2 commences to conduct. The voltage across capacitor C3 then follows that across C2 down causing capacitor C3 to discharge through transistor Q2. When the voltage across capacitor C2 rises, transistor Q2 stops conducting and capacitor C3 will again commence to charge from the constant current source provided by transistor Q1 at a 50μA rate. Because of the large change in transient voltage as shown in waveform C of FIG. 2, capacitor C3 is periodically discharged through transistor Q2. The net effect is that the voltage across capacitor C3 remains well below the turn-on voltage of 15 volts.

Fluctuations across capacitor C2 are much less for the higher frequency 20Hz ringing signals as shown by waveform A in FIG. 2. As a result, transistor Q2 does not conduct and the voltage across capacitor C3 continues to charge as shown in waveform B of FIG. 2 until conduction of diode D2 and hence transistor Q3 commences about 300 msec. after the application of the a-c ringing signals.

Once transistor Q3 commences to conduct, transistor Q4 and consequently Q5 and Q7 are turned off thereby turning off transistor Q1. Capacitor C3 then commences to discharge to ground as shown in waveform B of FIG. 2. However, the latching voltage supplied by zener diode D3 keeps transistor Q3 and consequently gating transistor Q6 turned on thereby maintaining the d-c supply voltage to the tone ringer 12 until the a-c signalling voltage is removed.

Typical exemplary values of selected components in the control circuit are as follows:

C1 = 0.5μf
C2 = 3.9μf
C3 = 1.0μf
R1 = 3.9KΩ
R2 = 18KΩ
$I_{Q1}$ = 50μA

A typical circuit with the above values will prevent a 300 volt peak transient signal at a repetition rate of 12Hz, from actuating the tone ringer, while allowing a 35 volt RMS (50 volt peak), 18Hz ringing signal to actuate the tone ringer after an interval of about 300 msec. from the application of the a-c ringing signal.

What is claimed is:

1. In a control circuit for controlling the on-off ringing of a line-powered electronic tone ringer in a telephone circuit, powered by incoming a-c ringing signals on a telephone line;

the control circuit comprising:

a network for rectifying and filtering an incoming a-c voltage to provide a d-c supply voltage;

a gating circuit for connecting the tone ringer to the d-c supply voltage when said voltage exceeds a preselected minimum amplitude;

the improvement comprising:

a suppression circuit for suppressing transient voltages such as dial pulses, having a magnitude greater than, and a repetition frequency less than said a-c ringing signals, to substantially prevent false actuation of said gating circuit;

said suppression circuit comprising:

a transistor and a capacitor connected in series across the output of the network to the d-c supply voltage, the capacitor being connected in shunt with the input to the gating circuit to provide an input control signal voltage thereto;

a diode connected in like polarity across the base-emitter of said transistor;

means for providing a constant current to said diode from said d-c supply voltage when said voltage is less than said preselected minimum amplitude; and means for rapidly discharging the capacitor when the amplitude of the input control signal voltage exceeds that of the d-c supply voltage.

2. A control circuit as defined in claim 1, in which the transistor is a first transistor and in which the means for providing a constant current comprises:

a second transistor connected in series with said diode across the output of the network, said second transistor being gated by said gating circuit.

3. A control circuit as defined in claim 2, in which the means for rapidly discharging the capacitor comprises:

a third transistor having its emitter-collector connected in shunt with said capacitor and its base connected to the base of the first transistor.

4. A control circuit as defined in claim 3, in which the collector of the first transistor is connected to the emitter of the third transistor, and to the input of the gating circuit;

the collector of the second transistor is connected to the bases of the first and third transistors; and the first and third transistors are of opposite conductivity type to the second.

5. In a control circuit for controlling the on-off ringing of a line-powered electronic tone ringer in a telephone set, powered by incoming a-c ringing signals on a telephone line;
the control circuit comprising:
a network for rectifying and filtering an incoming a-c voltage to provide a d-c supply voltage;
a gating circuit for connecting the tone ringer to the d-c supply voltage when said voltage exceeds a preselected minimum amplitude;
the improvement comprising:
a suppression circuit for suppressing transient voltages such as dial pulses, having a magnitude greater than, and a repetition frequency less than said a-c ringing signals, to substantially prevent false actuation of said gating circuit;
said suppression circuit comprising:
a capacitor connected across the input to the gating circuit for filtering an input control signal voltage thereto;
a source of constant current powered from said d-c supply voltage for charging said capacitor to develop said input control signal voltage;
means for rapidly discharging the capacitor when the amplitude of the input control signal voltage exceeds that of the d-c supply voltage.

* * * * *